US011837222B2

United States Patent
Ogawa et al.

(10) Patent No.: US 11,837,222 B2
(45) Date of Patent: Dec. 5, 2023

(54) DETERMINATION DEVICE, DETERMINATION METHOD, AND DETERMINATION PROGRAM

(71) Applicant: NIPPON TELEGRAPH AND TELEPHONE CORPORATION, Tokyo (JP)

(72) Inventors: Atsunori Ogawa, Musashino (JP); Marc Delcroix, Musashino (JP); Shigeki Karita, Musashino (JP); Tomohiro Nakatani, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 660 days.

(21) Appl. No.: 16/966,096

(22) PCT Filed: Feb. 1, 2019

(86) PCT No.: PCT/JP2019/003726
§ 371 (c)(1),
(2) Date: Jul. 30, 2020

(87) PCT Pub. No.: WO2019/151503
PCT Pub. Date: Aug. 8, 2019

(65) Prior Publication Data
US 2021/0035564 A1    Feb. 4, 2021

(30) Foreign Application Priority Data

Feb. 2, 2018   (JP) .................. 2018-017225

(51) Int. Cl.
*G10L 15/16*         (2006.01)
*G06F 18/2113*    (2023.01)
(Continued)

(52) U.S. Cl.
CPC ........ *G10L 15/183* (2013.01); *G06F 18/2113* (2023.01); *G06N 3/08* (2013.01); *G06N 5/046* (2013.01); *G10L 15/16* (2013.01)

(58) Field of Classification Search
CPC ............................ G06F 18/2113; G10L 15/16
See application file for complete search history.

(56) References Cited

U.S. PATENT DOCUMENTS

2007/0282621 A1* 12/2007 Altman .................. H04W 4/21
705/319
2012/0195475 A1*  8/2012 Abiko .................. G06V 10/987
382/115

(Continued)

FOREIGN PATENT DOCUMENTS

JP        2011-243147 A      12/2011

OTHER PUBLICATIONS

International Search Report and Written Opinion dated Apr. 9, 2019 for PCT/JP2019/003726 filed on Feb. 1, 2019, 9 pages including English Translation of the International Search Report.

(Continued)

*Primary Examiner* — Kevin Ky
(74) *Attorney, Agent, or Firm* — XSENSUS LLP

(57) ABSTRACT

A determination device includes a memory, and processing circuitry coupled to the memory and configured to accept input of a plurality of sequences provided as candidates for a solution to one given input, and determine, for two sequences of the plurality of sequences, a sequence that has a higher accuracy than the other sequence of the two sequences, using a model expressed as a neural network.

20 Claims, 9 Drawing Sheets

(51) Int. Cl.
*G10L 15/183* (2013.01)
*G06N 3/08* (2023.01)
*G06N 5/046* (2023.01)

(56) References Cited

U.S. PATENT DOCUMENTS

| | | | | |
|---|---|---|---|---|
| 2014/0378843 | A1* | 12/2014 | Valdes | A61B 1/063 |
| | | | | 600/476 |
| 2015/0132794 | A1* | 5/2015 | Bauer | C12M 41/36 |
| | | | | 435/34 |
| 2016/0034446 | A1* | 2/2016 | Yamamoto | G10H 7/008 |
| | | | | 704/9 |
| 2016/0224837 | A1* | 8/2016 | Lipert | G06V 40/172 |
| 2016/0278678 | A1* | 9/2016 | Valdes | A61B 5/14553 |
| 2017/0124385 | A1* | 5/2017 | Ganong | G06F 16/50 |
| 2017/0139906 | A1* | 5/2017 | Wang | G06F 40/53 |
| 2017/0237966 | A1* | 8/2017 | Ketterer | H04N 13/106 |
| | | | | 348/43 |
| 2017/0255842 | A1* | 9/2017 | Matsuki | G06F 18/28 |
| 2018/0172866 | A1* | 6/2018 | Vohra | G01V 3/34 |
| 2018/0238951 | A1* | 8/2018 | Tao | G06F 18/29 |
| 2018/0330718 | A1* | 11/2018 | Hori | G10L 15/32 |
| 2019/0042846 | A1* | 2/2019 | Ketterer | G06V 10/56 |
| 2019/0189115 | A1* | 6/2019 | Hori | G10L 15/22 |
| 2019/0318725 | A1* | 10/2019 | Le Roux | G10L 15/16 |
| 2020/0286465 | A1* | 9/2020 | Wang | G10L 15/32 |

OTHER PUBLICATIONS

Herbrich, R., et al., "Learning Preference Relations for Information Retrieval," AAAI Technical Report, 1998, pp. 83-86.

Iwatate, M., et al., "Japanese Dependency Parsing Using a Tournament Model," vol. 15, No. 5, Oct. 2008, pp. 169-185 (with English Abstract).

Kudo, T., and Matsumoto, Y., "Japanese Dependency Parsing using Relative Preference of Dependency," vol. 46, No. 4, Apr. 2005, pp. 1082-1092 (with English Abstract).

Oba, T., et al., "Round-Robin Duel Discriminative Language Models," IEEE Transactions on Audio, Speech, and anguage Processing, vol. 20, No. 4, May 2012, pp. 1244-1255.

Ogawa, A. and Hori, T., "Error detection and accuracy estimation in automatic speech recognition using deep bidirectional recurrent neural networks," Speech Communication, vol. 89, May 2017, pp. 70-83.

Ogawa, A., "Rescoring of N-Best speech recognition hypotheses using an encoder-classifier model that performs one-to-one hypothesis comparison," Lecture proceedings of 2018 spring research conference of the Acoustical Society of Japan, Mar. 2018, pp. 23-24.

Shimaoka, S., et al., "Learning of the word vector in the autoencoder," Proceedings of the 19th annual meeting of the Association for Natural Language Processing, Mar. 2013, pp. 612-615.

* cited by examiner

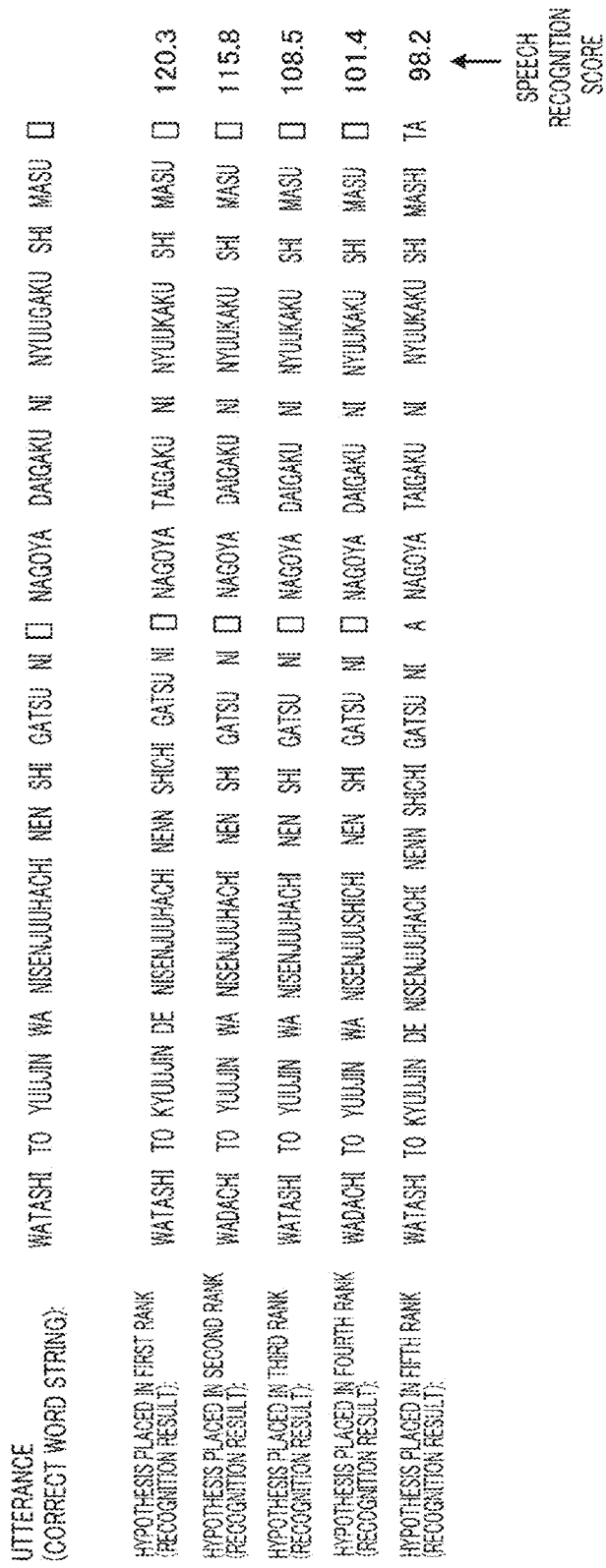

DETERMINATION DEVICE, DETERMINATION METHOD, AND DETERMINATION PROGRAM

CROSS-REFERENCE TO RELATED APPLICATIONS

The present application is based on PCT filing PCT/JP2019/003726, filed Feb. 1, 2019, which claims priority to JP 2018-017225, filed Feb. 2, 2018, the entire contents of each are incorporated herein by reference.

TECHNICAL FIELD

The present invention relates to a determination device, a determination method, and a determination program.

BACKGROUND ART

Speech recognition is a technology to convert speech (utterances) produced by humans into word strings (text) by a calculator. Generally, a speech recognition system outputs one word string (one best hypothesis) that is a hypothesis (speech recognition result) having the highest speech recognition score in response to one input utterance. However, speech recognition accuracy by a speech recognition device is not 100%. Therefore, there is a method called N-best re-scoring in which only one-best hypothesis is not output but N (≥2) hypotheses are output in response to one input utterance and a hypothesis estimated to have the highest speech recognition accuracy among the N hypotheses is output as a speech recognition result using an N-best scoring device. Note that an N-best re-scoring (model) and an N-best re-ranking (model) are handled as being synonymous with each other.

CITATION LIST

Non Patent Literature

[NPL 1] T. Oba, T. Hori, A. Nakamura, and A. Ito, "Round-Robin Duel Discriminative Language Models", IEEE Transactions on Audio, Speech, and Language Processing, vol. 20, no. 4, pp. 1244-1255, May 2012.

[NPL 2] A. Ogawa and T. Hori, "Error detection and accuracy estimation in automatic speech recognition using deep bidirectional recurrent neural networks", Speech Communication, vol. 89, pp. 70-83, May 2017.

SUMMARY OF THE INVENTION

Technical Problem

FIG. 8 is a diagram showing the processing procedure of N-best re-scoring. In the N-best re-scoring, speech recognition is first performed (step S32) when the input of one utterance is received (step S31), and N hypotheses that are speech recognition results are sorted in descending order and output on the basis of respective scores of the N hypotheses (step S33). The output hypotheses are N-best hypotheses. Using the N-best hypotheses, N-best re-scoring processing is performed (step S34). In the N-best re-scoring processing, the N-best hypotheses are re-scored using a model as post-processing. As the model, an N-best re-scoring model is, for example, used.

Then, in the N-best re-scoring processing, re-ranking in which the N-best hypotheses are sorted in descending order on the basis of the re-assigned scores is performed. In the N-best re-scoring processing, a hypothesis placed in the highest rank among the N-best hypotheses is extracted and output as a final speech recognition result.

Normally, the value of N is often set at about 100 to 1000. Note that only one hypothesis may be obtained even if N is set at two or more. In this case, the N-best re-scoring becomes meaningless.

FIG. 9 is a diagram showing a specific example of N-best hypotheses. In FIG. 9, N is set at five or more to perform speech recognition, and five hypotheses placed in the first to fifth ranks are obtained. In FIG. 9, "[ ]" indicates the non-existence of a word. The hypotheses are sorted in descending order on the basis of their speech recognition scores. In the example of FIG. 9, a hypothesis placed in the third rank is an Oracle hypothesis having the highest speech recognition accuracy (the smallest error). It is expected that the hypothesis placed in the third rank be re-ranked to the first rank.

Here, a language model that statistically expresses (evaluates) the probability of the easiness of word connection is often employed as an N-best re-scoring model, with attention given to the correctness of a word string that is speech recognition hypothesis as language. The correctness of a word string as language refers to the naturalness of a word string and the correctness of connection between words.

Conventionally, for example, a discriminative language model that gives a higher score to a hypothesis having higher recognition accuracy on the basis of a log linear model has been increasingly studied with an n-chain (n is generally about one to three) of words included in each hypothesis of N-best hypotheses as a feature.

Further, in recent years, an RNN language model based on a recurrent neural network (RNN) among NN language models based on a neural network has been increasingly used as an N-best re-scoring model on the basis of the development of the neural network (NN).

Here, the discriminative language model is learned using N-best hypotheses. Therefore, the discriminative language model is a model for performing N-best re-scoring in consideration of a speech recognition error but is not a model based on the latest NN.

On the other hand, the RNN language model is a model based on the latest NN. However, since the RNN language model is learned using a correct word string that does not include an error, the RNN language model cannot consider a speech recognition error. Further, the RNN language model is a model that indicates high N-best re-scoring accuracy but originally estimates which word is likely to occur after a word string when the word string is given. That is, the RNN language model is not a model for performing N-best re-scoring in a narrow sense. In other words, it can be said that the function of estimating a next word by the RNN language model is a function that is more than a function necessary for performing the N-best re-scoring.

As described above, in order to determine a candidate having the highest accuracy (the smallest error) among a plurality of series given as solution candidates to one input, it is expected that an optimum model for determining the candidate having the highest accuracy among the plurality of series be realized based on the latest NN instead of the discriminative language model or the RNN language model.

The present invention has been made in view of the foregoing, and an object thereof is to provide a determination device, a determination method, and a determination program for accurately determining the candidate with the highest accuracy, from among a plurality of sequences provided as candidates for the solution to one given input.

Means for Solving the Problem

In order to solve the above-described problems and achieve the object, a determination device according to the present invention includes: a memory; and processing circuitry coupled to the memory and configured to: accept input of a plurality of sequences provided as candidates for the solution to one given input, and determine, for two sequences of the plurality of sequences, a sequence that has a higher accuracy than the other sequence of the two sequences, using a model expressed as a neural network.

Effects of the Invention

According to the present invention, a candidate with the highest accuracy is accurately determined from among a plurality of sequences provided as candidates for the solution to one given input.

BRIEF DESCRIPTION OF DRAWINGS

FIG. 9 is a diagram showing a specific example of N-best hypotheses.

DESCRIPTION OF EMBODIMENTS

Figure 1:
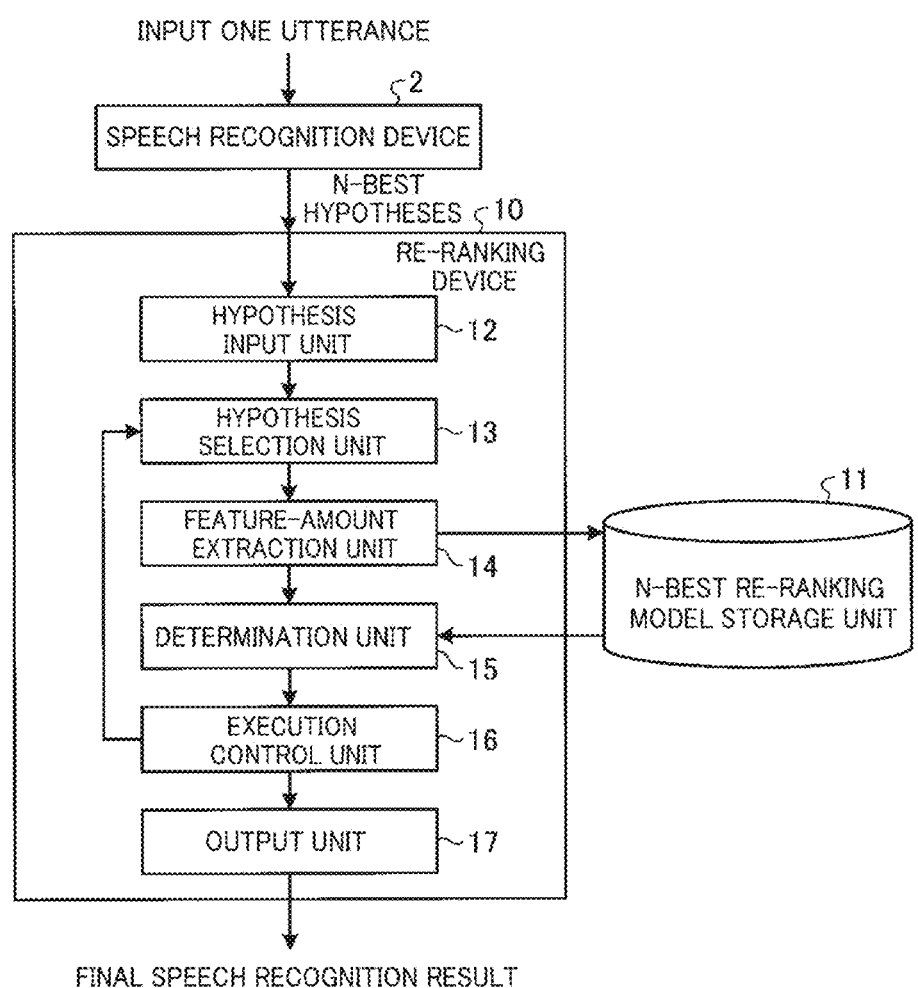
FIG. 1 is a diagram showing an example of the function configuration of a re-ranking device according to an embodiment.

Hereinafter, an embodiment of the present invention will be described in detail with reference to the drawings. Note that the present invention is not limited to the embodiment. Further, the same portions will be denoted by the same reference signs in the description of the drawings. In the present embodiment, N-best (N≥2) hypotheses that are speech recognition results will be illustrated as a plurality of series of correct answer candidates. Then, the present embodiment will describe a re-ranking device that uses an N-best re-ranking model to obtain a hypothesis (word string) having the highest speech recognition accuracy that is a final speech recognition result among the N-best hypotheses and a learning device that realizes the N-best re-ranking model. Note that in the present embodiment, an N-best re-ranking (model) will be described as a unified expression instead of an N-best re-scoring (model).

First, a minimum necessary function that should be retained by the N-best re-ranking model when the re-ranking device according to the present embodiment performs the re-ranking of N-best hypotheses will be described. According to a conventional method, the N-best hypotheses are sorted so that their scores are arranged in descending order as a result of re-scoring. However, the main purpose of the N-best re-scoring is to find a hypothesis (Oracle hypothesis) having the highest speech recognition accuracy from the N-best hypotheses as a final speech recognition result. Therefore, the N-best hypotheses after the re-scoring are not necessarily required to be sorted. Attention is given to this point in the present embodiment.

That is, in the present embodiment, attention is given to the point that the minimum necessary function of the N-best re-ranking model to find the Oracle hypothesis from the N-best hypotheses by re-ranking is a function with which it is possible to determine which one of hypotheses has higher speech recognition accuracy when attention is given to two hypotheses among the N-best hypotheses. In other words, the minimum necessary function of the N-best re-ranking model is a function with which it is possible to perform a one-to-one hypothesis comparison with respect to two hypotheses among the N-best hypotheses.

Therefore, the re-ranking device according to the present embodiment uses the N-best re-ranking model that has the function of performing a one-to-one hypothesis comparison and that is represented by NN. As a result, the re-ranking device is allowed to have the function of determining a hypothesis having higher speech recognition accuracy among two hypotheses. Then, the re-ranking device according to the present embodiment leaves a hypothesis having higher speech recognition accuracy as one hypothesis and selects one of undetermined hypotheses as the other hypothesis to perform a comparison using the N-best re-ranking model. The re-ranking device according to the present embodiment selects a hypothesis determined to have higher speech recognition accuracy in a previous determination as one hypothesis that is a determination target, and selects any of undetermined hypotheses as the other hypothesis. After that, comparative processing is repeatedly performed on two hypotheses by the N-best re-ranking model. Thus, it is possible to find the Oracle hypothesis from the N-best hypotheses in the present embodiment.

EMBODIMENT

Re-Ranking Device

Next, the re-ranking device according to the embodiment will be described. The re-ranking device repeatedly determines which one of two hypotheses among N-best hypotheses that are speech recognition results has higher speech recognition accuracy using an N-best re-ranking model represented by NN, and outputs a hypothesis having the highest speech recognition accuracy as a final speech recognition result.

FIG. 1 is a diagram showing an example of the function configuration of the re-ranking device according to the embodiment. A re-ranking device 10 according to a first embodiment is realized, for example, when a prescribed program is read into a computer or the like including a ROM (Read Only Memory), a RAM (Random Access Memory), a CPU (Central Processing Unit), or the like and performed by the CPU.

The re-ranking device 10 receives the input of N-best hypotheses output from a speech recognition device 2. Then, the re-ranking device 10 determines which one of two hypotheses among the N-best hypotheses has higher speech recognition accuracy for all the N-best hypotheses, and outputs a left hypothesis having the highest speech recognition accuracy as a final speech recognition result. Note that when receiving the input of one utterance, the speech recognition device 2 performs, for example, speech recognition using a speech recognition model and outputs N-best hypotheses as speech recognition results. The speech recognition model is learned (model parameters are optimized) using a plurality of utterances for learning and transcriptions (correct word strings) corresponding to the respective utterances as learning data.

The re-ranking device 10 has an N-best re-ranking model storage unit 11, a hypothesis input unit 12, a hypothesis selection unit 13, a feature-amount extraction unit 14, a determination unit 15, an execution control unit 16, and an output unit 17.

The N-best re-ranking model storage unit 11 stores an N-best re-ranking model. The N-best re-ranking model is a model represented by NN. The N-best re-ranking model is learned in advance using N-best hypotheses for learning having known speech recognition accuracy. The N-best re-ranking model is learned so as to be capable of determining the speech recognition accuracy levels of two series when given feature amounts of the two series as for a plurality of combinations of two series among the N-best hypotheses for learning. The N-best re-ranking model converts two hypotheses into hidden state vectors using an RNN. Then, using the NN, the N-best re-ranking model outputs a first posterior probability indicating that the sequence of the accuracy levels of the two hypotheses is correct and a second posterior probability indicating that the sequence of the accuracy levels of the two hypotheses is incorrect on the basis of the hidden state vectors. In other words, in the N-best re-ranking model, binary classification feedforward NN (FFNN) is connected to the subsequent stage of the RNN. The binary classification FFNN outputs the following two posterior probabilities on the basis of the hidden state vectors converted by the RNN.

(1) The first posterior probability indicating that the ranking relationship between the two hypotheses in the N-best hypotheses is correct.

(2) The second posterior probability indicating that the ranking relationship between the two hypotheses in the N-best hypotheses is incorrect.

The hypothesis input unit 12 receives the input of N-best hypotheses. The N-best hypotheses are output from the speech recognition device 2. Alternatively, another device may input the N-best hypotheses to the re-ranking device 10 via a network or the like.

The hypothesis selection unit 13 selects two hypotheses that are one-to-one comparison targets from among the input N-best hypotheses. The hypothesis selection unit 13 selects any two hypotheses as a set from among the N-best hypotheses according to a certain rule. Specifically, the hypothesis selection unit 13 selects a hypothesis estimated to have the highest accuracy at comparison as one of the two hypotheses. The hypothesis selection unit 13 selects a hypothesis placed in a next rank from among the hypotheses that became comparison targets last time as the other of the two hypotheses. In this manner, the hypothesis selection unit 13 selects two hypotheses that are comparison targets from among the N-best hypotheses so that a one-to-one comparison is performed with respect to all the N-best hypotheses.

The feature-amount extraction unit 14 extracts a feature amount for each of two hypotheses that are one-to-one comparison targets. The feature-amount extraction unit 14 extracts a feature amount for each of a hypothesis (word string) placed in the u-th rank and a hypothesis placed in the v-th rank (u<v≤N) in the N-best hypotheses that are one-to-one comparison targets. The feature-amount extraction unit 14 extracts a feature-amount vector for each word in the hypotheses. The feature-amount vector of each word is, for example, one obtained by connecting an acoustic score (logarithmic likelihood), a language score (logarithmic probability), or the like for each word obtained by speech recognition processing to a word vector as an auxiliary feature amount, the word vector expressing a word ID that is a discrete value as the vector of a continuous value by NN word embedding processing.

The determination unit 15 determines which one of the two hypotheses that are one-to-one comparison targets has higher speech recognition accuracy using the N-best re-ranking model. Specifically, the determination unit 15 inputs feature amounts of a hypothesis placed in the u-th rank and a hypothesis placed in the v-th rank (u<v≤N) that are one-to-one comparison targets to the N-best re-ranking model, and determines which one of the hypotheses has higher speech recognition accuracy using an output result by the N-best re-ranking model. The ranks of the hypotheses represented by the u-th rank and the v-th rank are those having already been assigned to the N-best hypotheses. The re-ranking device 10 does not reset the ranks.

Here, the N-best re-ranking model outputs a first posterior probability indicating that the hypothesis placed in u-th rank has higher speech recognition accuracy than the hypothesis placed in the v-th rank and a second posterior probability indicating that the hypothesis placed in the v-th rank has higher speech recognition accuracy than the hypothesis placed in the u-th rank when receiving the input of the feature amount of the hypothesis placed in the u-th rank and the feature amount of the hypothesis placed in the v-th rank. The determination unit 15 determines that the hypothesis placed in the u-th rank has higher speech recognition accuracy than the hypothesis placed in the v-th rank when the first posterior probability is higher than the second posterior probability. Further, the determination unit 15 determines that the hypothesis placed in the v-th rank has higher speech recognition accuracy than hypothesis placed in the u-th rank when the first posterior probability is lower than the second posterior probability.

Note that the N-best re-ranking model may have the function of the feature-amount extraction unit 14 in the re-ranking device 10. In this case, the determination unit 15 inputs the two hypotheses that are comparison targets to the N-best re-ranking model.

Then, the determination unit 15 leaves a hypothesis determined to have higher accuracy among the two series of the comparison targets as a comparison target for a next determination, and excludes the other hypothesis from subsequent comparison targets. The hypothesis selection unit 13 selects the hypothesis determined to have the higher accuracy by the determination unit 15 as one of the two series, and selects any of the N-best hypotheses that have not been determined by the determination unit 15 as the other hypothesis. Specifically, as described above, the hypothesis selection unit 13 selects the hypothesis left by the determination unit 15 as one of the two hypotheses, and selects a hypothesis placed in a rank next to the rank of the hypothesis that became a comparison target last time among the N-best hypotheses as the other hypothesis of the two hypotheses.

The execution control unit 16 performs control to repeat the determination processing by the determination unit 15 and the selection processing by the hypothesis selection unit 14 until a prescribed condition is satisfied. In this case, the execution control unit 16 performs control to repeat the selection processing by the hypothesis selection unit 13 to select two hypotheses that are comparison targets, feature-amount extraction processing by the feature-amount extraction unit 14, and determination processing by the determination unit 15 so that a one-to-one comparison is performed with respect to all N-best hypotheses. Specifically, the execution control unit 16 performs control to repeat the hypothesis selection processing, the feature-amount extraction processing, and the determination processing until a hypothesis placed in the N-th rank becomes a comparison target.

The output unit 17 outputs a hypothesis left as a comparison target among the N-best hypotheses as a hypothesis having the highest speech recognition accuracy, that is, as a final speech recognition result when the prescribed condition is satisfied as a result of the repetition of the hypothesis selection processing, the feature-amount extraction processing, the determination processing, and the rank setting processing. The output unit 17 outputs a hypothesis determined to have higher accuracy in the last determination processing as a final speech recognition result.

Next, minimum necessary function requirements for the N-best re-ranking model are defined by mathematical formulas. $W^{(u)} = w_1^{(u)}, w_2^{(u)}, \ldots, w_{L(W^{(u)})}^{(u)}$ is defined as the hypothesis (word string) placed in the u-th rank in the N-best hypotheses. Further, $L(W^{(u)})$ is defined as the length (the number of words) of $W^{(u)}$.

Further, $A^{(u)} = a_1^{(u)}, a_2^{(u)}, \ldots, a_{L(W^{(u)})}^{(u)}$ is defined as an auxiliary feature-amount vector string corresponding to $W^{(u)}$. An auxiliary feature-amount vector $a_i^{(u)}$ of the i-th word $w_i^{(u)}$ in $W^{(u)}$ is, for example, an acoustic score (logarithmic likelihood), a language score (logarithmic probability), or the like obtained as a result of speech recognition processing by a speech recognition device (see, for example, Non Patent Literature 2 for details).

Further, $X^{(u)} = x_1^{(u)}, x_2^{(u)}, \ldots, x_{L(W^{(u)})}^{(u)}$ is defined as a feature-amount vector string corresponding to $W^{(u)}$. A feature-amount vector $x_i^{(u)}$ of the i-th word $w_i^{(u)}$ in $W^{(u)}$ is obtained by $x_i^{(u)} = \text{concat}(\text{embed}(w_i^{(u)}), a_i^{(u)})$. Here, concat(•) represents vector concatenation processing. Further, embed(•) represents word embedding processing by the NN (processing to express the word ID of a discrete value as the vector of a continuous value) (see, for example, Natural Language Processing by Deep Learning, MLP Machine Learning Professional Series, by Yuta Tsuboi, Yuya Unno, and Jun Suzuki and Published by Kodansha in 2017 (hereinafter referred to as Reference 1) for details). Note that the NN for performing embed(•) is also a part of the N-best re-scoring model, and that its parameters are learned (optimized) simultaneously with the parameters of an encoder RNN and a binary classification FFNN that will be described later.

When given feature-amount vector strings $X^{(u)}$ and $X^{(v)}$ of the hypothesis $W^{(u)}$ placed in the u-th rank and the hypothesis $W^{(v)}$ placed in the v-th rank (u<v≤N) in the N-best hypotheses, the N-best re-ranking model in the re-ranking device 10 outputs the posterior probabilities P of the two classes of symbols y={0, 1}. y=0 indicates that the ranking relationship between $W^{(u)}$ and $W^{(v)}$ is correct. Further, y=1 indicates that the ranking relationship between $W^{(u)}$ and $W^{(v)}$ is incorrect. $P(0|X^{(u)}, X^{(v)})$ is the first posterior probability probabilistically expressing that the ranking relationship between the hypothesis placed in the u-th rank and the hypothesis placed in the v-th rank is correct. $P(1|X^{(u)}, X^{(v)})$ is the second posterior probability probabilistically expressing that the ranking relationship between the hypothesis placed in the u-th rank and the hypothesis placed in the v-th rank is incorrect.

The determination unit 15 acquires the first posterior probability $P(0|X^{(u)}, X^{(v)})$ and the second posterior probability $P(1|X^{(u)}, X^{(v)})$ output from the N-best re-ranking model, compares the magnitudes of the two acquired posterior probabilities with each other, and determines which one of the hypothesis placed in the u-the rank and the hypothesis placed in the v-the rank has higher speech recognition accuracy. When the first posterior probability $P(0|X^{(u)}, X^{(v)})$ is higher than the second posterior probability $P(1|X^{(u)}, X^{(v)})$, the determination unit 15 determines that the hypothesis placed in the u-th rank has higher speech recognition accuracy than the hypothesis placed in the v-th rank. Further, when the first posterior probability $P(0|X^{(u)}, X^{(v)})$ is lower than the second posterior probability $P(1|X^{(u)}, X^{(v)})$, the determination unit 15 determines that the hypothesis placed in the v-th rank has higher speech recognition accuracy than the hypothesis placed in the u-th rank.

That is, as shown in the following formulas (1-1) and (1-2), the determination unit 15 determines which one of the hypothesis placed in the u-th rank and the hypothesis placed in the v-th rank has higher speech recognition accuracy.

$$P(0|X^{(u)}, X^{(v)}) \geq P(1|X^{(u)}, X^{(v)})$$

$$\text{if } \text{acc}(W^{(u)}) \geq \text{acc}(W^{(v)}) \tag{1-1}$$

$$P(0|X^{(u)}, X^{(v)}) < P(1|X^{(u)}, X^{(v)})$$

$$\text{otherwise} \tag{1-2}$$

Here, acc($W^{(u)}$) is a function that returns the speech recognition accuracy of a given hypothesis (word string), and $\Sigma_y P(y|X^{(u)}, X^{(v)}) = 1$. When the inequality shown in the first stage of the above formula (1-1) is satisfied, the determination unit 15 determines that the hypothesis $W^{(u)}$ has higher speech recognition accuracy than the hypothesis $W^{(v)}$. Further, when the inequality shown in the above formula (1-2) is satisfied, the determination unit 15 determines that the hypothesis $W^{(u)}$ has lower speech recognition accuracy than the hypothesis $W^{(v)}$.

Accordingly, when the inequality shown in the first stage of the above formula (1-1) is satisfied, it is estimated that the ranking relationship (u<v) between $W^{(u)}$ and $W^{(v)}$ is correct. Therefore, the determination unit 15 leaves $W^{(u)}$ as a hypothesis having higher speech recognition accuracy than $W^{(v)}$ in a one-to-one hypothesis comparison with $W^{(v)}$ and is continuously used as $W^{(u)}$ in a next one-to-one hypothesis comparison. Note that the determination unit 15 handles $W^{(v)}$ as a hypothesis having lower speech recognition accuracy than $W^{(u)}$ and excludes $W^{(v)}$ from hypothesis candidates having the highest speech recognition accuracy, that is, from final speech recognition result candidates.

Then, when the inequality shown in the first stage of the above formula (1-2) is satisfied, it is estimated that the ranking relationship between $W^{(u)}$ and $W^{(v)}$ is incorrect. That is, it is estimated that the ranking relationship between $W^{(u)}$ and $W^{(v)}$ is opposite. Therefore, the determination unit 15 leaves $W^{(v)}$ as a hypothesis having higher speech recognition accuracy than $W^{(u)}$ in the one-to-one hypothesis comparison with $W^{(u)}$, and uses $W^{(v)}$ as $W^{(u)}$ in the next one-to-one hypothesis comparison. Note that the determination unit 15 handles the original $W^{(u)}$ as a hypothesis having lower speech recognition accuracy than the original $W^{(v)}$, and excludes $W^{(u)}$ from the hypothesis candidates having the highest speech recognition accuracy, that is, from the final speech recognition result candidates. Note that the N-best re-ranking model may compare the magnitudes of the first posterior probability $P(0|X^{(u)}, X^{(v)})$ and the second posterior probability $P(1|X^{(u)}, X^{(v)})$ with each other to determine which one of the hypothesis placed in the u-th rank and the hypothesis placed in the v-th rank has higher speech recognition accuracy and estimate a determination as to which one of the hypotheses leaves.

Construction Example of N-Best Re-Ranking Model

Figure 2:
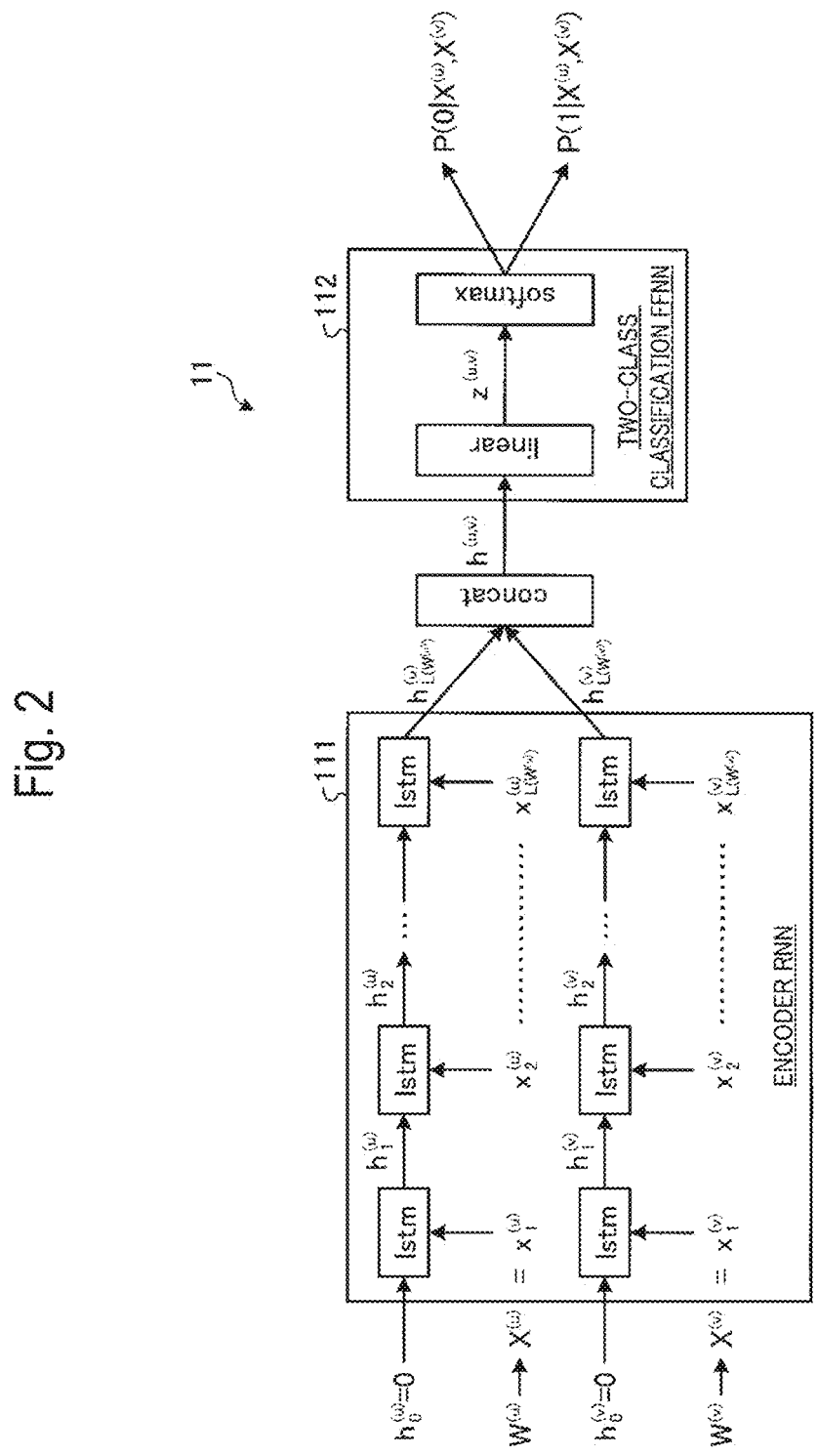
FIG. 2 is a diagram showing a construction example of an N-best re-scoring model.

FIG. 2 is a diagram showing a construction example of the N-best re-ranking model. Note that the NN for performing word embedding processing embed(•) is omitted in FIG. 2 for simplicity. Hereinafter, the details will be described.

There is a possibility that the lengths $L(W^{(u)})$ and $L(W^{(v)})$ (the number of words) (u<v≤N) of the hypotheses $W^{(u)}$ and $W^{(v)}$ that are comparison targets are different from each other. In order to absorb the difference in length, the N-best re-ranking model converts the two hypotheses into hidden state vectors using the RNN. Specifically, the N-best re-ranking model has an encoder RNN111 of an encoder-decoder model (see, for example, Reference 1 for details) to perform the processing.

The N-best re-ranking model can express $W^{(u)}$ and $W^{(v)}$ as fixed-length hidden state vectors using the encoder RNN111. Then, the N-best re-ranking model is allowed to compare $W^{(u)}$ and $W^{(v)}$ with each other with fairness by using the hidden state vectors.

The processing of the encoder RNN111 will be described. The encoder RNN111 has a long short-term memory (LSTM) unit (see, for example, Reference 1 for details) that is a kind of the RNN. When given a feature-amount vector $x_i^{(u)}$ of the i-th word $w_i^{(u)}$ of $W^{(u)}$ and the i−1-th hidden state vector $hu_{\{i-1\}}^{(u)}$, the LSTM unit gives the i-th hidden state vector $h_i^{(u)}$ as shown in the following formula (2).

$$h_i^{(u)} = \text{lstm}(x_i^{(u)}, h_{\{i-1\}}^{(u)}) \quad (2)$$

Here, lstm(•) indicates one-layer unidirectional processing by the LSTM unit. Further, $h0^{(u)}$ is equal to zero (zero vector). $h_i^{(u)}$ is a vector in which feature-amount vector strings $x_1^{(u)}, x_2^{(u)}, \ldots, x_i^{(u)}$ of word strings $w_1^{(u)}, w_2^{(u)}, \ldots, w_i^{(u)}$ are encoded. By repeating the processing for each feature-amount vector $x_i^{(u)}$ in a feature-amount vector string $X^{(u)}$, the encoder RNN111 can obtain a hidden state vector $h_{L(W(u))}^{(u)}$ in which $X^{(u)}$ is encoded.

The encoder RNN111 performs the same processing on a feature-amount vector string $X^{(v)}$ to obtain a hidden state vector $h_{L(W(v))}^{(v)}$ in which $X^{(v)}$ is encoded. Note that the LSTM unit that performs the processing on $X^{(u)}$ and the LSTM unit that performs the processing on $X^{(v)}$ may be same, that is, parameters may be shared. Alternatively, different LSTM units may be used. Further, in FIG. 2, a subscript L(W(u)) in $x_{L(W(u))}^{(u)}$, $x_{L(W(v))}^{(v)}$, $h_{L(w(u))}^{(u)}$, and $h_{L(W(v))}^{(v)}$ is shown as $L(W^{(u)})$.

The N-best re-ranking model obtains a hidden state vector $h^{\{(u,v)\}}$ in which the above two hidden state vectors $h_{L(W(u))}^{(u)}$ and $h_{L(W(v))}^{(v)}$ are connected to each other as the output of the encoder RNN11 as shown in the following formula (3).

$$h^{\{u,v\}} = \text{concat}(h_{L(W(u))}^{(u)}, h_{L(W(v))}^{(v)}) \quad (3)$$

Then, the N-best re-ranking model connects an NN for performing class classification (y=0 or 1) to the subsequent stage of the encoder RNN111. For example, the N-best re-ranking model uses a single-layer feedforward type NN (FFNN) 112 (see, for example, Reference 1) as an NN for performing binary classification. The hidden state vector $h^{\{(u, v)\}}$ obtained as the output of the encoder RNN111 is input to the single-layer binary classification FFNN, and a posterior probability $P(y|X^{(u)}, X^{(v)})$ of the two classes of symbols y={0, 1} can be finally obtained as shown in the following formulas (4) and (5).

$$z^{\{(u,v)\}} = \text{linear}(h^{\{(u,v)\}}) \quad (4)$$

$$P(y|X^{(u)}, X^{(v)}) = \text{softmax}(z^{\{(u,v)\}})_y \quad (5)$$

Here, linear (•) represents linear transformation processing (see, for example, Reference 1 for details). softmax(•) represents softmax processing. Further, softmax(•)$_y$ represents the y-th element (probability value) of a posterior probability vector obtained as a result of the softmax processing.

Another Construction Example 1 of N-Best Re-Ranking Model

Note that the LSTM unit of the encoder RNN111 shown in FIG. 2 is a single-layer unidirectional LSTM unit but may be a multi-layer or bidirectional LSTM unit.

Another Construction Example 2 of N-Best Re-Ranking Model

Further, a simple (having the following sigmoid function or the like as an activation function) RNN or a gated recurrent unit (GRU) may be used instead of the LSTM unit.

Another Construction Example 3 of N-Best Re-Ranking Model

In addition, the N-best re-ranking model uses the single-layer feedforward type NN as a binary classification NN in the construction example of FIG. 2. However, the N-best re-ranking model may use a multi-layer feedforward type NN. When using the multi-layer feedforward type NN, the N-best re-ranking model can use a sigmoid function, a tan h function, a rectified linear unit (ReLU) function, a parametric ReLU (PReLU) function, or the like as an activation function. Note that please see, for example, Reference 1 for the details of the terms of other construction examples 1 to 3 of the N-best re-ranking model.

Another Construction Example 4 of N-Best Re-Ranking Model

Further, the N-best re-ranking model is also allowed to additionally use a score calculated by a conventional N-best re-scoring model (for example, an RNN language model) as a new dimension in a feature-amount vector.

Processing Procedure of Re-Ranking Processing

Figure 3:
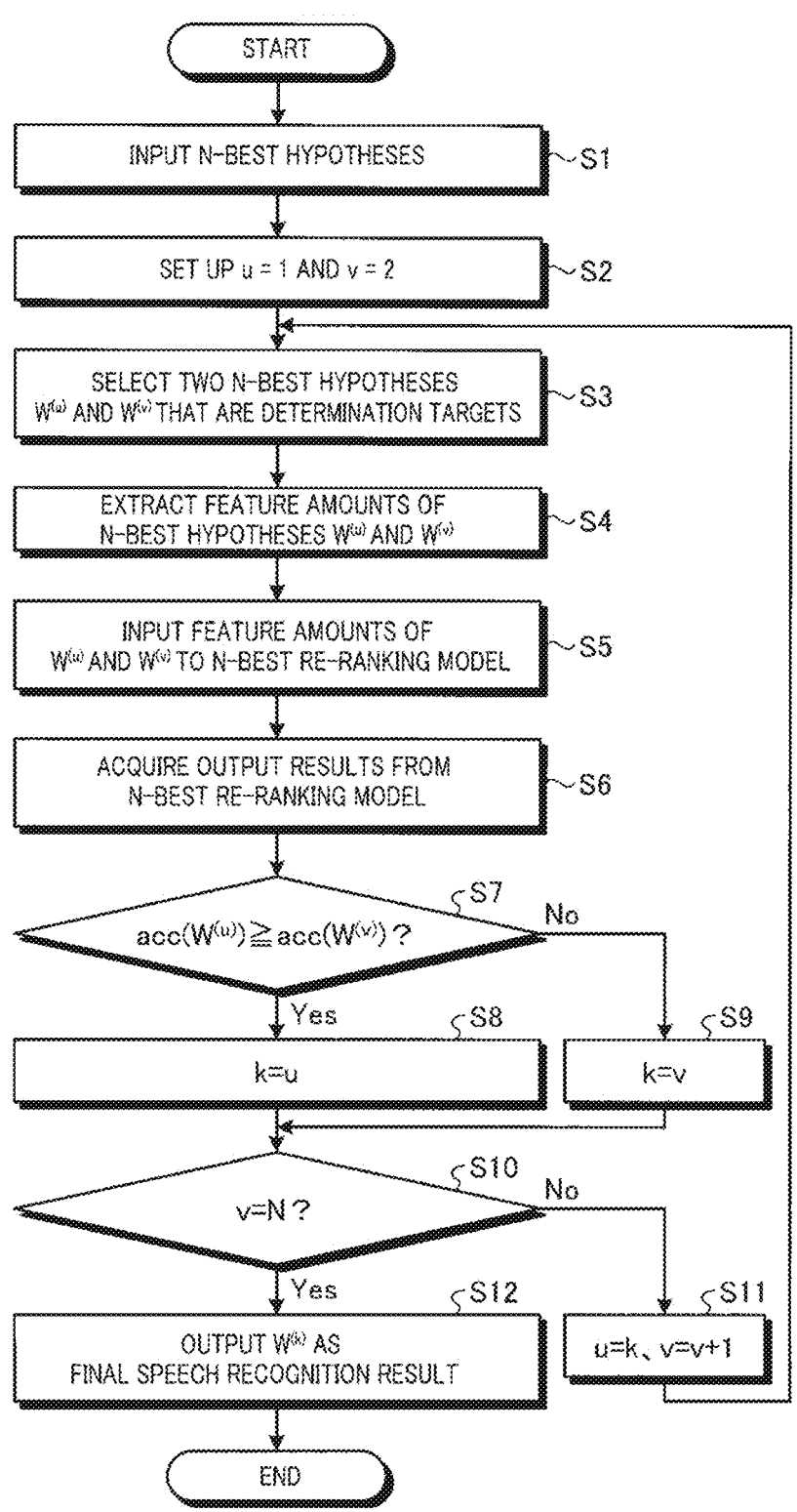
FIG. 3 is a flowchart showing the processing procedure of re-ranking processing performed by the re-ranking device shown in FIG. 1.

Next, the processing procedure of re-ranking processing performed by the re-ranking device 10 shown in FIG. 1 will be described. FIG. 3 is a flowchart showing the processing procedure of the re-ranking processing performed by the re-ranking device 10 shown in FIG. 1.

First, when the hypothesis input unit 12 receives the input of N-best hypotheses that are re-ranking targets (step S1), the hypothesis selection unit 13 sequentially selects two hypotheses placed in the u-th and v-th ranks that are one-to-one comparison targets from among the received N-best hypotheses (u<v≤N). First, the hypothesis selection unit 13 sets up u=1 and v=2 (step S2). Then, the hypothesis selection unit 13 selects the two hypotheses $W^{(u)}$ and $W^{(v)}$ placed in the u-th and v-th ranks, respectively, from among the received N-best hypotheses (step S3). Next, the feature-amount extraction unit 14 extracts feature amounts of the hypotheses $W^{(u)}$ and $W^{(v)}$ (step S4). The determination unit 15 inputs the feature amounts ($X^{(u)}$, $X^{(v)}$) of the hypotheses $W^{(u)}$ and $W^{(v)}$ to an N-best re-ranking model (step S5).

The determination unit 15 acquires output results from the N-best re-ranking model (step S6). Specifically, the determination unit 15 acquires a first posterior probability $P(0|X^{(u)}, X^{(v)})$ and a second posterior probability $P(1|X^{(u)}, X^{(v)})$.

Then, as described in the above formulas (1-1) and (1-2), the determination unit 15 determines whether $acc(W^{(u)}) \geq acc(W^{(v)})$ is established (step S7). When $P(0|X^{(u)}, X^{(v)}) \geq P(1|X^{(u)}, X^{(v)})$ is established, the determination unit 15 determines that $acc(W^{(u)})$ is greater than or equal to $acc(W^{(v)})$. On the other hand, when $P(0|X^{(u)}, X^{(v)})$ is smaller than $P(1|X^{(u)}, X^{(v)})$, the determination unit 15 determines that $acc(W^{(u)}) \geq acc(W^{(v)})$ is not established.

When the determination unit 15 determines that $acc(W^{(u)}) \geq acc(W^{(v)})$ is established (Yes in step S7), the ranking setting unit 16 sets up k=u for k (step S8). k is the rank of a hypothesis having the highest speech recognition accuracy among the N-best hypothesis. On the other hand, when the determination unit 15 determines that $acc(W^{(u)}) \geq acc(W^{(v)})$ is not established (No in step S7), the ranking setting unit 16 sets up k=v (step S9).

Next, the execution control unit 16 determines whether v=N is established (step S10). When determining that v=N is not established (No in step S10), the execution control unit 16 causes the hypothesis selection unit 13 to select next hypotheses that are comparison targets since necessary one-to-one hypothesis comparison processing has not been finished completely. Specifically, the hypothesis selection unit 13 sets up u=k and v=v+1 (step S11), and returns to step S3 to select N-best hypotheses $W^{(u)}$ and $W^{(v)}$ that are next determination targets. Then, the re-ranking device 10 performs the processing of steps S4 to S10 on the N-best hypotheses $W^{(u)}$ and $W^{(v)}$.

Further, when determining that v=N is established (Yes in step S10), the execution control unit 16 outputs $W^{(k)}$ placed in the k-th rank as a hypothesis having the highest speech recognition accuracy, that is, as a final speech recognition result (step S12) to end the processing since the necessary one-to-one comparison processing has been completely finished. In this manner, the re-ranking device 10 uses any two hypotheses as a set and repeatedly determines which one of the hypotheses has higher speech recognition accuracy for each of a plurality of sets. As a result, the re-ranking device 10 can output a hypothesis estimated to have the highest speech recognition accuracy as a final speech recognition result.

Learning Device

Figure 4:
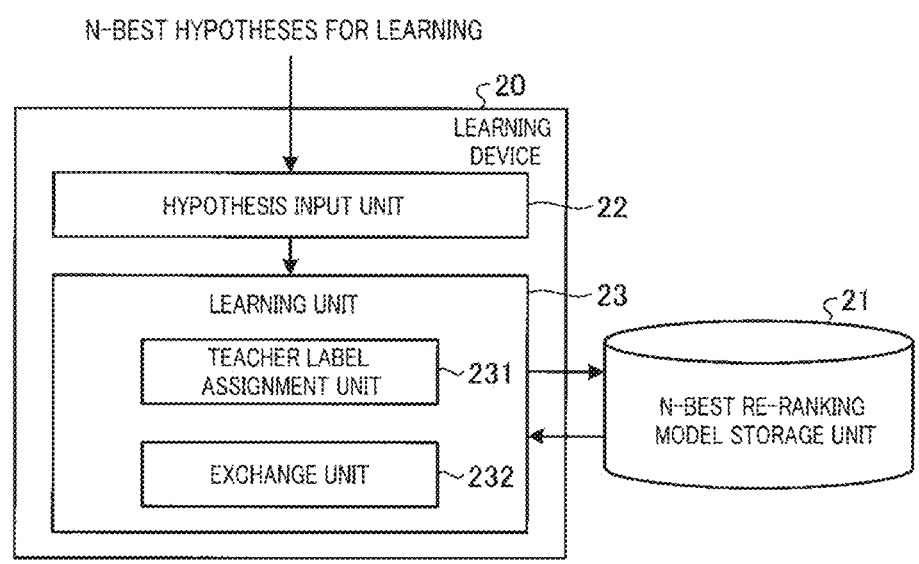
FIG. 4 is a diagram showing an example of the function configuration of a learning device according to the embodiment.

Next, a learning device that learns the N-best re-ranking model used by the re-ranking device 10 will be described. FIG. 4 is a diagram showing an example of the function configuration of the learning device according to the embodiment. A learning device 20 according to the first embodiment is realized, for example, when a prescribed program is read into a computer or the like including a ROM, a RAM, a CPU, or the like and performed by the CPU. As shown in FIG. 4, an N-best re-ranking model storage unit 21 and the learning device 20 have a hypothesis input unit 22 and a learning unit 23.

The N-best re-ranking model storage unit 21 stores the N-best re-ranking model that is a learning target. The N-best re-ranking model is represented by NN. The N-best re-ranking model converts two hypotheses among N-best hypotheses into hidden state vectors using an RNN. Then, using the NN, the N-best re-ranking model outputs a first posterior probability indicating that the sequence of the accuracy levels of the two hypotheses is correct and a second posterior probability indicating that the sequence of the accuracy levels of the two hypotheses is incorrect on the basis of the hidden state vectors.

The hypothesis input unit 22 receives the input of N-best hypotheses for learning having known speech recognition accuracy. It is assumed that speech recognition is performed on respective utterances in learning data to obtain the N-best hypotheses of the respective utterances as the N-best hypotheses for learning. Further, the speech recognition accuracy of all the hypotheses is known since the learning data is used. Further, it is assumed that feature-amount vector strings are extracted from all the N-best hypotheses as described above.

The learning unit 23 learns the N-best re-ranking model that is capable of determining the accuracy levels of two hypotheses when given feature amounts of the two hypotheses among the N-best hypotheses for learning. The learning unit 23 gives feature-amount vector strings of the two hypotheses among the N-best hypotheses for learning and teacher labels (that will be described later) corresponding to the feature-amount vector strings to the N-best re-ranking model. Thus, the learning unit 23 learns (optimizes the parameters of) the N-best re-ranking model with which it is possible to correctly determine the speech recognition accuracy levels of the two hypotheses. Specifically, the learning unit 23 inputs the feature-amount vector strings and the corresponding teacher labels to the N-best re-ranking model, and learns the N-best re-ranking model so that the N-best re-ranking model can correctly output the corresponding teacher labels when given the feature-amount vectors. The learning unit 23 has a teacher label assignment unit 231 and an exchange unit 232.

The teacher label assignment unit 231 assigns a teacher label (y=0) indicating a correct answer to the N-best re-ranking model to be learned when a hypothesis having higher speech recognition accuracy among the two hypotheses is placed in a higher rank than the other hypothesis. Further, the teacher label assignment unit 231 assigns a teacher label (y=1) indicating an error to the N-best re-ranking model to be learned when a hypothesis having higher speech recognition accuracy among the two hypotheses is placed in a lower rank than the other hypothesis.

The exchange unit 232 exchanges the ranks of the two hypotheses among the N-best hypotheses for learning with each other and also exchanges the corresponding teacher labels with each other to learn the N-best re-ranking model. For example, as for the two hypotheses to which y=0 is assigned as a teacher label, the exchange unit 232 exchanges the ranks of the two hypotheses with each other and changes the teacher label y to 1. On the other hand, as for the two hypotheses to which y=1 is assigned as a teacher label, the exchange unit 232 exchanges the ranks of the two hypotheses with each other and changes the teacher label y to 0.

Processing Procedure of Learning Processing

Figure 5:
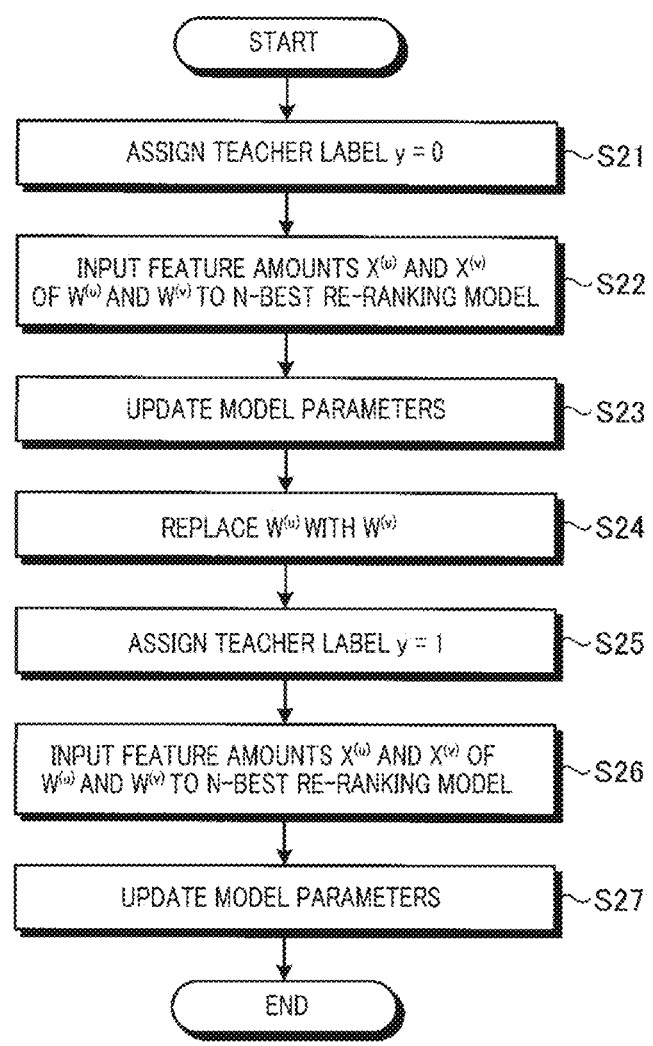
FIG. 5 is a flowchart showing the processing procedure of learning processing performed by the learning device shown in FIG. 4.

Next, the processing procedure of learning processing performed by the learning device 20 shown in FIG. 4 will be described. FIG. 5 is a flowchart showing the processing procedure of the learning processing performed by the learning device shown in FIG. 4. In FIG. 5, $W^{(u)}$ and $W^{(v)}$ (u<v≥N) are given as two hypotheses from the N-best hypotheses, and the processing procedure of the learning processing when acc($W^{(u)}$)≥acc($W^{(v)}$) is established is shown.

As shown in FIG. 5, the teacher label assignment unit 231 assigns a teacher label y=0 (step S21) and inputs feature amounts $X^{(u)}$ and $X^{(v)}$ of $W^{(u)}$ and $W^{(v)}$ to the N-best re-ranking model (step S22) to learn the N-best re-ranking model and update the model parameters of the N-best re-ranking model (step S23). That is, according to the above formula (1-1), the model should ideally output a posterior probability P(0|$X^{(u)}$, $X^{(v)}$)=1 when the feature amount vectors $X^{(u)}$ and $X^{(v)}$ of the two hypotheses $W^{(u)}$ and $W^{(v)}$ are input to the N-best re-ranking model. Therefore, the teacher label assignment unit 231 gives y=0 as a teacher label. On the basis of the above input, the learning unit 23 updates the model parameters (the parameters of an encoder RNN (LSTM unit) and an NN for performing binary classification FFNN and word embedding processing embed(•) simultaneously).

Then, the exchange unit 232 exchanges the ranks of the hypotheses $W^{(u)}$ and $W^{(v)}$ with each other (step S24). That is, the exchange unit 232 exchanges the hypothesis originally serving as $W^{(u)}$ with $W^{(v)}$, and exchanges the hypothesis originally serving as $W^{(v)}$ with $W^{(u)}$. In this case, acc($W^{(u)}$)≥acc($W^{(v)}$) is not established. Accordingly, according to the above formula (1-2), the model should ideally output a posterior probability P(1|$X^{(u)}$, $X^{(v)}$)=1 when the feature amount vectors $X^{(u)}$ and $X^{(v)}$ of the two hypotheses $W^{(u)}$ and $W^{(v)}$ are input to the N-best re-ranking model. Therefore, the teacher label assignment unit 231 assigns y=1 as a teacher label (step S25), and inputs the feature amounts $X^{(u)}$ and $X^{(v)}$ of $W^{(u)}$ and $W^{(v)}$ to the N-best re-ranking model (step S26). On the basis of the above input, the learning unit 23 learns the N-best re-ranking model, updates the model parameters of the N-best re-ranking model (step S27), and ends the learning processing of the two hypotheses $W^{(u)}$ and $W^{(v)}$.

The learning device 20 repeats the above procedure with respect to the N-best hypotheses of each utterance in learning data, and further repeats the repetition itself several times (some epochs). The learning unit 23 can perform a further specific procedure of the learning in the same manner as conventional NN learning (see, for example, Reference 1 for details).

Efficiency Example 1 of Learning Processing

The processing procedure of the learning processing shown in FIG. 5 has a high calculation cost. For example, when E is the number of epochs and M is the number of utterances in learning data, the number of update times of the model parameters in the above learning procedure becomes $E \times M \times N \times 2 \times {}_NC_2$ at maximum. Normally, E is about several dozen, M is at least tens of thousands, and N is about 100 to 1000 as described above. Therefore, the number of the update times of the model parameters reaches a huge number. Therefore, it is preferable to increase learning efficiency in the present embodiment. To this end, an efficiency example 1 of the learning will be described below.

As described above, the main purpose of the N-best re-scoring is to find an Oracle hypothesis as a final speech recognition result from the N-best hypotheses. In other words, the Oracle hypothesis may only be distinguished from other N−1 hypotheses with high accuracy. In order to realize this, one of two hypotheses input to the N-best re-ranking model during learning is set as the Oracle hypothesis. In this manner, the number of the update times of the model parameters can be reduced to $E \times M \times N \times 2 \times (N-1)$.

Efficiency Example 2 of Learning Processing

Next, an efficiency example 2 of the learning will be described. In the efficiency example 1 of the learning, the Oracle hypothesis and other N−1 hypotheses included in the N-best hypotheses are compared with each other when the N-best hypotheses are given. In the efficiency example 2 of the learning processing, the number of other hypotheses to be compared with the Oracle hypothesis is narrowed down.

For example, the following four typical hypotheses are first selected.

A hypothesis 1 is a hypothesis having the second-highest speech recognition accuracy after the Oracle hypothesis.

A hypothesis 2 is a hypothesis having the highest speech recognition score.

A hypothesis 3 is a hypothesis having the lowest speech recognition accuracy.

A hypothesis 4 is a hypothesis having the lowest speech recognition score.

The hypothesis 1 and the hypothesis 2 are hypotheses having (or estimated to have) high speech recognition accuracy, and are difficult to be distinguished from the Oracle hypothesis. On the other hand, the hypothesis 3 and the hypothesis 4 are hypotheses having (or estimated to have) low speech recognition accuracy, and are easily (have to be reliably) distinguished from the Oracle hypothesis. When other hypotheses are narrowed down to only the above four hypotheses, the number of the update times of the model parameters can be reduced to $E \times M \times N \times 2 \times 4$.

However, it may be considered that variety as alternative hypotheses of the Oracle hypothesis cannot be sufficiently secured only with the above four hypotheses. In this case, a prescribed number of hypotheses extracted according to a prescribed rule from left N−5 hypotheses excluding the Oracle hypothesis and the above four hypotheses from the N-best hypotheses may be selected and used together with the four hypotheses as alternative hypotheses. For example, Q hypotheses extracted at even intervals or at random from N−5 left hypotheses excluding the Oracle hypothesis and the four hypotheses are selected as the other hypothesis of two hypotheses and used as the other hypothesis together with the four hypotheses. At this time, the number of the update times of the model parameters becomes $E \times M \times N \times 2 \times (4+Q)$. Q is, for example, any of 5 to 50.

Evaluation

Actually, the comparative evaluation between the N-best re-scoring in the present embodiment and a conventional RNN language model was performed. During the use (evaluation) of the N-best re-ranking model, the model estimates the two classes of the posterior probabilities P(y|$X_{(u)}$, $X_{(v)}$), y={0, 1} according to the above formulas (1-1) and (1-2). The re-ranking device 10 may perform N-best re-ranking using these posterior probabilities as they are. Further, like a conventional N-best re-ranking model, the re-ranking device 10 may perform the weighting addition of an original speech recognition score and a score (the logarithmic value of a posterior probability) based on the N-best re-ranking model using the following formula (6), and perform the N-best re-ranking on the basis of the value.

Score=(1−λ)×speech recognition score+λ×score based on N-best re-ranking model (6)

Note that λ is the weight of the N-best re-ranking model, and 0≤λ≤1 is established in the above formula (6). When λ=1 is set, the re-ranking device 10 performs the N-best re-ranking using only the score based on the N-best re-ranking model without using the speech recognition score.

Evaluation Results

Figure 6:
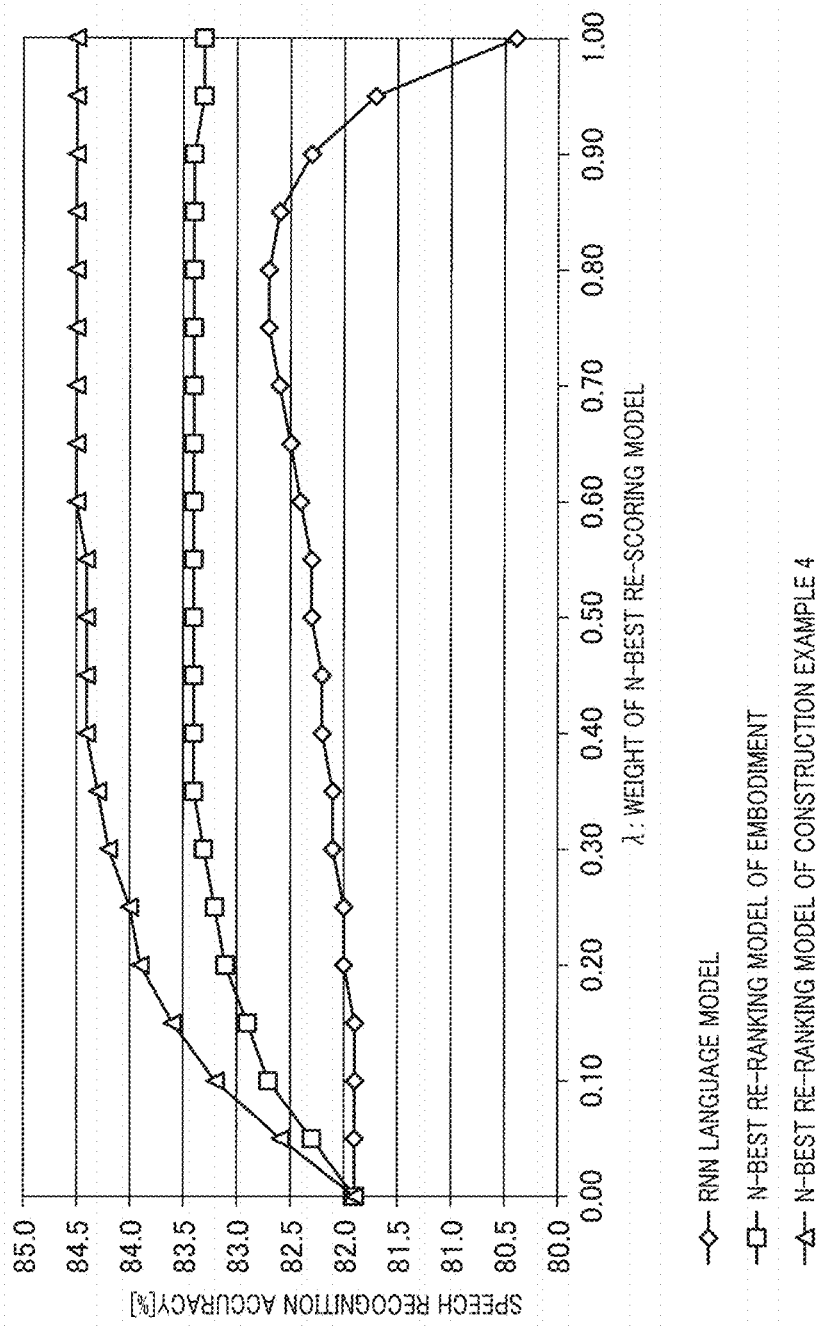
FIG. 6 is a diagram showing evaluation results of N-best re-ranking.

FIG. 6 is a diagram showing evaluation results of the N-best re-ranking. FIG. 6 shows, as an example of the evaluation results of the N-best re-ranking, results in which the following three models are compared and evaluated using a Japanese spoken language corpus.
(1) The convention RNN language model
(2) The N-best re-ranking model used by the re-ranking device 10 of the present embodiment
(3) The N-best re-ranking model (another construction example 4) in which the score of an RNN language model is added as one dimension of a feature-amount vector
In the evaluation, the N-best re-ranking is performed using a score obtained by performing the weight addition of a speech recognition score and a score based on the N-best re-ranking model according to the above formula (6).

As shown in FIG. 6, it is found that the N-best re-ranking model of the present embodiment can more reliably improve speech recognition accuracy than the conventional RNN language model. Further, as shown in the construction example 4, it is found that the speech recognition accuracy of the N-best re-ranking model can be further improved by adding the score of the RNN language model as one dimension of a feature-amount vector.

In addition, it is found from FIG. 6 that the use of a speech recognition score is necessary and that the optimum value of a weight λ is relatively narrow in the conventional RNN language model. According to the evaluation, λ is around 0.8 in the conventional RNN language model. On the other hand, it is found that, when the N-best re-ranking model of the present embodiment is used, the range of the optimum value of λ is wider than that of the conventional RNN language model. That is, the N-best re-ranking model of the present embodiment has a robust λ value. Alternatively, when the N-best re-ranking model of the present embodiment is used, it is found that the use of a speech recognition score is not necessary since the highest speech recognition accuracy or speech recognition accuracy close to the highest speech recognition accuracy is obtained at λ=1.

Effects of Embodiment

The re-ranking device 10 according to the present embodiment receives the input of N-best hypotheses that are speech recognition results, and determines which one of two hypotheses among the N-best hypotheses has higher speech recognition accuracy using the N-best re-ranking model represented by NN.

As described above, the minimum necessary function that should be retained by the N-best re-ranking model when the re-ranking device 10 performs the re-ranking of N-best hypotheses is to find a hypothesis (Oracle hypothesis) having the highest speech recognition accuracy from the N-best hypotheses as a final speech recognition result. Therefore, the N-best hypotheses after re-scoring are not necessarily required to be sorted.

Therefore, in the present embodiment, the N-best re-ranking model is allowed to have the function of determining which one of two hypotheses among N-best hypotheses has higher speech recognition accuracy in order to find an Oracle hypothesis from the N-best hypotheses by re-ranking. In other words, the N-best re-ranking model is allowed to have the function of performing a one-to-one hypothesis comparison on two hypotheses among the N-best hypotheses.

Specifically, the re-ranking device 10 is allowed to find the Oracle hypothesis from the N-best hypotheses by using the N-best re-ranking model that is represented by NN and has the function of performing a one-to-one hypothesis comparison and by repeating the one-to-one hypothesis comparison processing on two hypotheses using the N-best re-ranking model.

In addition, the learning device 20 causes, with two hypotheses among N-best hypotheses for learning having known speech recognition accuracy as a set, the N-best re-ranking model to perform learning in advance so as to be capable of determining a speech recognition accuracy level for each of a plurality of sets. Accordingly, the learning device 20 can realize an optimum model to perform N-best re-ranking on the basis of the latest NN. Then, by using the N-best re-ranking model learned in the learning device 20, the re-ranking device 10 can perform a one-to-one hypothesis comparison with high accuracy and realize the extraction of an Oracle hypothesis with high accuracy.

According to the present embodiment, it is possible to realize the N-best re-ranking model that can obtain a final speech recognition result from N-best hypotheses with high accuracy and is represented by NN as described above. According to the present embodiment, it is possible to obtain a final speech recognition result with high accuracy by using the N-best re-ranking model.

Note that in the present embodiment, a one-to-one hypothesis comparison is finished when a hypothesis estimated to be an Oracle hypothesis (a hypothesis having the highest accuracy) is found. In addition, a hypothesis estimated to have the second-highest accuracy can be found by performing the same processing as that used to find the Oracle hypothesis on N−1 hypotheses excluding the hypothesis estimated to be the Oracle hypothesis. After this, it is also possible to sort the N-best hypotheses by repeating the processing.

Further, the present embodiment describes the N-best re-ranking model illustrated in FIG. 2 as a model for performing the re-ranking of the speech recognition N-best hypotheses. However, the model of the present embodiment is not limited to application to speech recognition N-best hypotheses, and is applicable to every task employing N-best hypotheses. For example, the present embodiment is also applicable also to machine translation, text summary, or the like. Further, the series of the present embodiment is also applicable not only to character strings but also to a plurality of series including numerals or alphabets.

For this reason, in the present embodiment, if there are a plurality of series given as solution candidates to one input, it is possible to determine which one of two series has higher accuracy (a smaller error) using a model represented by NN. Then, in the present embodiment, a series determined to have higher accuracy among the two series is left as a comparison target, and the other series is excluded from comparison targets. Next, a series determined to have higher accuracy is selected as one hypothesis of two series, and selects any of the plurality of series that have not been determined as the other hypothesis. Then, in the present embodiment, the determination processing and the selection processing are sequentially performed until a prescribed condition is satisfied. In this manner, according to the present embodiment, a series that is left as a comparison target when the prescribed condition is satisfied can be output as a series having the highest accuracy, that is, as a final output.

Further, in this case, in the present embodiment, a model that is capable of determining the accuracy levels of two series when given feature amounts of the two series among a plurality of series for learning having known accuracy and that is represented by NN is learned. Then, in the present embodiment, when a series having higher accuracy (a smaller error) among the two series is placed in a higher rank than the other series, a teacher label indicating a correct answer is assigned to the model to be learned. Further, in the present embodiment, when the series having higher accuracy (a smaller error) among the two series is placed in a lower rank than the other series, a teacher label indicating an error is assigned to the model to be learned. In the present embodiment, a one-to-one series comparison can be performed with high accuracy by the model. As a result, a series having the highest accuracy can be obtained with high accuracy.

System Configuration or the Like

The respective constituting elements of the respective devices shown in the figures are functionally conceptual and are not necessarily required to be physically configured as shown in the figures. That is, the specific modes of distribution and integration of the respective devices are not limited to those shown in the figures, but all or a part of the respective devices can be configured to be functionally or physically distributed and integrated in any unit according to various loads, use conditions, or the like. For example, the re-ranking device 10 and the learning device 20 may be integrated into one device. In addition, all or a part of the respective processing functions performed by the respective devices can be realized by a CPU and a program analyzed and performed by the CPU, or can be realized as hardware based on a wired logic.

Further, all or a part of the processing described as being automatically performed among the respective processing described in the present embodiment can be manually performed. Alternatively, all or a part of the processing described as being manually performed can be automatically performed by a known method. Further, the respective processing described in the present embodiment is performed in time series according to the order described, but may be performed in parallel or separately depending on the processing performance of the devices that perform the processing or as occasion demands. Besides, the processing procedures, the control procedures, the specific names, and the information including various data or parameters shown in the above document or the drawings can be arbitrarily changed unless otherwise specified.

Program

Figure 7:
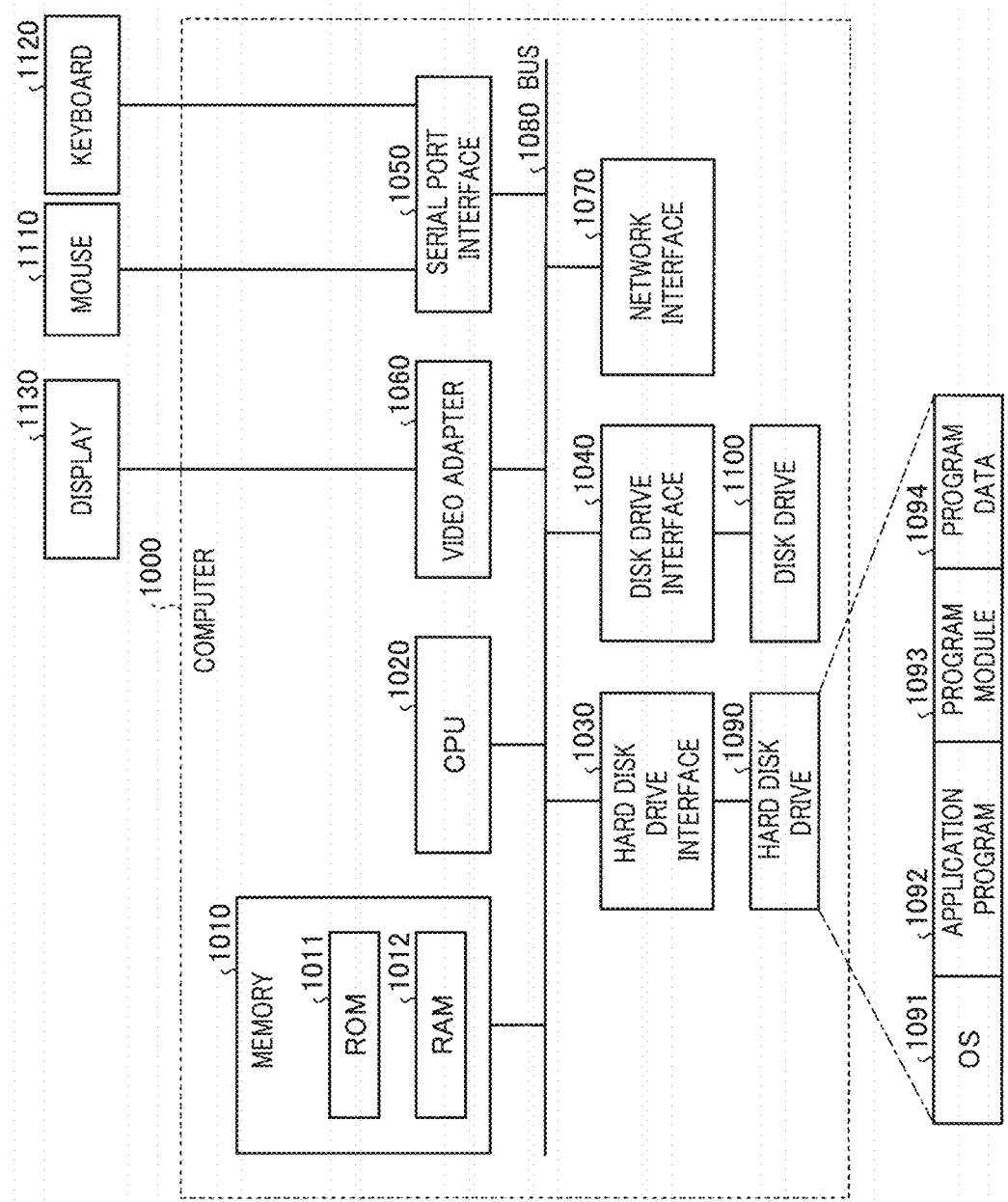
FIG. 7 is a diagram showing an example of a computer in which the re-ranking device and the learning device are realized when a program is performed.
Figure 8:
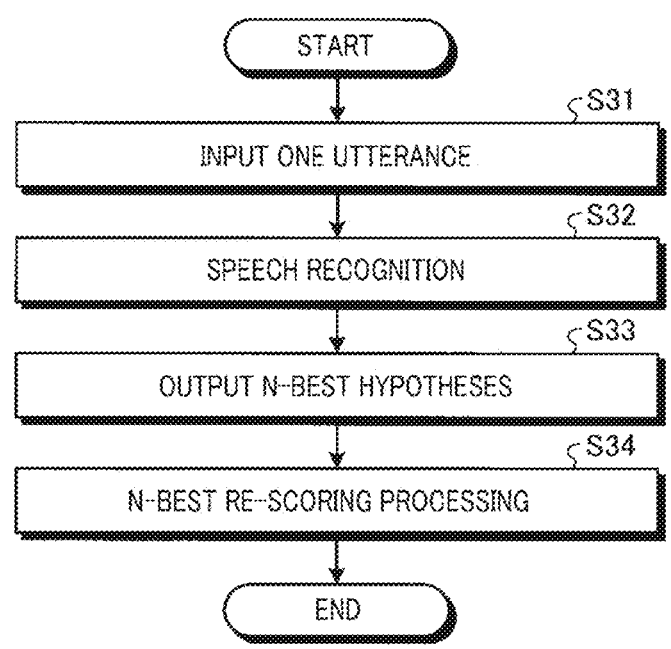
FIG. 8 is a diagram showing the processing procedure of N-best re-scoring.

FIG. 7 is a diagram showing an example of a computer in which the re-ranking device 10 or the learning device 20 is realized when a program is performed. A computer 1000 has, for example, a memory 1010 and a CPU 1020. Further, the computer 1000 has a hard disk drive interface 1030, a disk drive interface 1040, a serial port interface 1050, a video adapter 1060, and a network interface 1070. These respective units are connected to each other via a bus 1080.

The memory 1010 includes a ROM 1011 and a RAM 1012. The ROM 1011 stores, for example, a boot program such as BIOS (Basic Input Output System). The hard disk drive interface 1030 is connected to a hard disk drive 1031. The disk drive interface 1040 is connected to a disk drive 1041. For example, a detachable storage medium such as a magnetic disk and an optical disk is inserted into the disk drive 1041. The serial port interface 1050 is connected to, for example, a mouse 1110 and a keyboard 1120. The video adapter 1060 is connected to, for example, a display 1130.

The hard disk drive 1031 stores, for example, an OS 1091, an application program 1092, a program module 1093, and program data 1094. That is, a program that defines the respective processing of the re-ranking device 10 or the learning device 20 is mounted as the program module 1093 in which a code capable of being performed by the computer 1000 is described. The program module 1093 is stored in, for example, the hard disk drive 1031. For example, the program module 1093 for performing the same processing as that of the function configuration of the re-ranking device 10 or the learning device 20 is stored in the hard disk drive 1031. Note that the hard disk drive 1031 may be replaced by an SSD (Solid State Drive).

Further, the setting data used in the processing of the above embodiment is stored in, for example, the memory 1010 or the hard disk drive 1031 as the program data 1094. Then, the CPU 1020 reads the program module 1093 or the program data 1094 stored in the memory 1010 or the hard disk drive 1031 into the RAM 1012 to be performed as occasion demands.

Note that the program module 1093 or the program data 1094 is not necessarily stored in the hard disk drive 1031 but may be stored in, for example, a detachable storage medium and read by the CPU 1020 via the disk drive 1041 or the like. Alternatively, the program module 1093 or the program data 1094 may be stored in another computer connected via a network (such as a LAN (Local Area Network) and a WAN (Wide Area Network)). Then, the program module 1093 or the program data 1094 may be read from the other computer by the CPU 1020 via the network interface 1070.

The embodiment to which the invention made by the present inventor is applied is described above, but the present invention is not limited to the description and the drawings based on the embodiment constituting a part of the disclosure of the present invention. That is, other embodiments, examples, operation technologies, or the like made by persons skilled in the art on the basis of the present embodiment are all included in the scope of the present invention.

REFERENCE SIGNS LIST

2 Speech recognition device
10 Re-ranking device
11, 21 N-best re-ranking model storage unit
12 Hypothesis input unit
13 Hypothesis selection unit
14 Feature-amount extraction unit
15 Determination unit
16 Execution control unit
17 Output unit
20 Learning device
22 Hypothesis input unit 23 Learning unit
231 Teacher label assignment unit
232 Exchange unit

The invention claimed is:

1. A determination device comprising:
a memory; and
processing circuitry coupled to the memory and configured to:
accept input of a plurality of sequences provided as candidates for a solution to one given input, and
perform a one-to-one comparison of two sequences of the plurality of sequences to determine, for the two sequences of the plurality of sequences, a sequence that has a higher accuracy than the other sequence of the two sequences, using a model expressed as a neural network.

2. The determination device according to claim 1, wherein the model converts the two sequences into hidden state vectors, using a recurrent neural network, and outputs a first posterior probability indicating that the order of the degrees of accuracy of two sequences is correct, and a second posterior probability indicating that the order of the degrees of accuracy of two sequences is incorrect, using a neural network, based on the hidden state vector.

3. The determination device according to claim 1, wherein the processing circuitry is further configured to save a sequence determined as the sequence that has a higher accuracy than the other sequence of the two sequences, as a subject of a comparison, and exclude the other sequence from subjects of a comparison.

4. The determination device according to claim 3, wherein the processing circuitry is further configured to:
select the sequence determined at the determining as a sequence with a higher accuracy, as one hypothesis of two sequences, and selects, from among the plurality of sequences, one sequence that has not been subjected to the determination at the determining, as the other hypothesis,
sequentially cause the determining and the selecting to respectively perform determination processing and selection processing until a predetermined condition is reached, and
upon the predetermined condition being reached, output a sequence that still remains as a subject of a comparison, as a sequence with the highest accuracy.

5. The determination device according to claim 4, wherein the processing circuitry is further configured to:
accept input of N-best hypotheses (N≥2) that are results of speech recognition,
determine, for two hypotheses of the N-best hypotheses, which hypothesis has a higher speech recognition accuracy than the other hypothesis, using the model expressed as a neural network, save the hypothesis determined as the hypothesis with a higher accuracy than the other hypothesis, as a subject of a comparison, and exclude the other hypothesis from subjects of a comparison,
select the hypothesis saved at the determining, as one hypothesis of two hypotheses, and select, from among the N-best hypotheses, a hypothesis that ranks next to the hypothesis previously subjected to a comparison, as the other hypothesis of the two hypotheses,
perform control to repeat the determination processing at the determining and the selection processing at the selecting on the N-best hypotheses until a predetermined condition is reached, and
upon the predetermined condition being reached, output a hypothesis determined as a hypothesis with a high accuracy in the final determination processing, as the ultimate result of speech recognition.

6. The determination device according to claim 5, wherein the model, upon a hypothesis at a $u^{th}$ rank and a hypothesis at a $v^{th}$ rank (u<v≤N) being input thereto, a first posterior probability indicating that the hypothesis at the $u^{th}$ rank has a higher speech recognition accuracy than the hypothesis at the $v^{th}$ rank, and a second posterior probability indicating that the hypothesis at the $v^{th}$ rank has a higher speech recognition accuracy than the hypothesis at the $u^{th}$ rank, and
if the first posterior probability is higher than the second posterior probability, the processing circuitry is further configured to determine that the hypothesis at the e rank has a higher speech recognition accuracy than the hypothesis at the $v^{th}$ rank, and if the first posterior probability is lower than the second posterior probability, the processing circuitry is further configured to determine that the hypothesis at the $v^{th}$ rank has a higher speech recognition accuracy than the hypothesis at the $u^{th}$ rank.

7. The determination device according to claim 6, wherein the model further receives feature-amount vectors for the hypothesis at the $u^{th}$ rank and the hypothesis at the $v^{th}$ rank in order to determine the sequence that has the higher accuracy.

8. The determination device according to claim 7, wherein each feature-amount vector corresponds to a word in a respective one of the hypothesis at the $u^{th}$ rank and the hypothesis at the $v^{th}$ rank.

9. The determination device according to claim 8, wherein each feature-amount vector includes an acoustic score and a language score for a respective word of a respective one of the hypothesis at the $u^{th}$ rank and the hypothesis at the $v^{th}$ rank.

10. The determination device according to claim 1, wherein the neural network is a single-layer feed-forward neural network.

11. The determination device according to claim 1, wherein the neural network is a multi-layer feed-forward neural network.

12. The determination device according to claim 11, wherein the multi-layer feed-forward neural network uses, as an activation function, one of a sigmoid function, a tanh function, a rectified linear unit (ReLU) function, or a parametric ReLU.

13. A determination method that is performed by a determination device, the determination method comprising:
accepting input of a plurality of sequences provided as candidates for a given solution; and
performing a one-to-one comparison of two sequences of the plurality of sequences to determine, for the two sequences of the plurality of sequences, a sequence that has fewer errors than the other sequence of the two sequences, using a model expressed as a neural network.

14. The determination method according to claim 13, further comprising saving a sequence determined as the sequence that has a higher accuracy than the other sequence of the two sequences, as a subject of a comparison, and excluding the other sequence from subjects of a comparison.

15. The determination method according to claim 13, further comprising:
selecting the sequence determined at the determining as a sequence with a higher accuracy, as one hypothesis of two sequences, and selecting, from among the plurality of sequences, one sequence that has not been subjected to the determination at the determining, as the other hypothesis, sequentially causing the determining and the selecting to respectively perform determination processing and selection processing until a predetermined condition is reached, and upon the predetermined condition being reached, outputting a sequence that still remains as a subject of a comparison, as a sequence with the highest accuracy.

16. The determination method according to claim 13, wherein the neural network is one of a single-layer feed-forward neural network and a multi-layer feed-forward neural network.

17. A non-transitory computer-readable recording medium storing therein a determination program that causes a computer to execute a process comprising:

accepting input of a plurality of sequences provided as candidates for a given solution; and performing a one-to-one comparison of two sequences of the plurality of sequences to determine, for the two sequences of the plurality of sequences, a sequence that has fewer errors than the other sequence of the two sequences, using a model expressed as a neural network.

18. The non-transitory computer-readable medium according to claim 17 further storing a program that causes the computer to further execute a process comprising:

saving a sequence determined as the sequence that has a higher accuracy than the other sequence of the two sequences, as a subject of a comparison, and excluding the other sequence from subjects of a comparison.

19. The non-transitory computer-readable medium according to claim 18 further storing a program that causes the computer to further execute a process comprising:

selecting the sequence determined at the determining as a sequence with a higher accuracy, as one hypothesis of two sequences, and selecting, from among the plurality of sequences, one sequence that has not been subjected to the determination at the determining, as the other hypothesis, sequentially causing the determining and the selecting to respectively perform determination processing and selection processing until a predetermined condition is reached, and upon the predetermined condition being reached, outputting a sequence that still remains as a subject of a comparison, as a sequence with the highest accuracy.

20. The non-transitory computer-readable medium according to claim 17 wherein the neural network is one of a single-layer feed-forward neural network and a multi-layer feed-forward neural network.

* * * * *